March 23, 1965    J. HARITON    3,174,438
CONVEYER SYSTEM
Filed Feb. 12, 1962    6 Sheets-Sheet 1
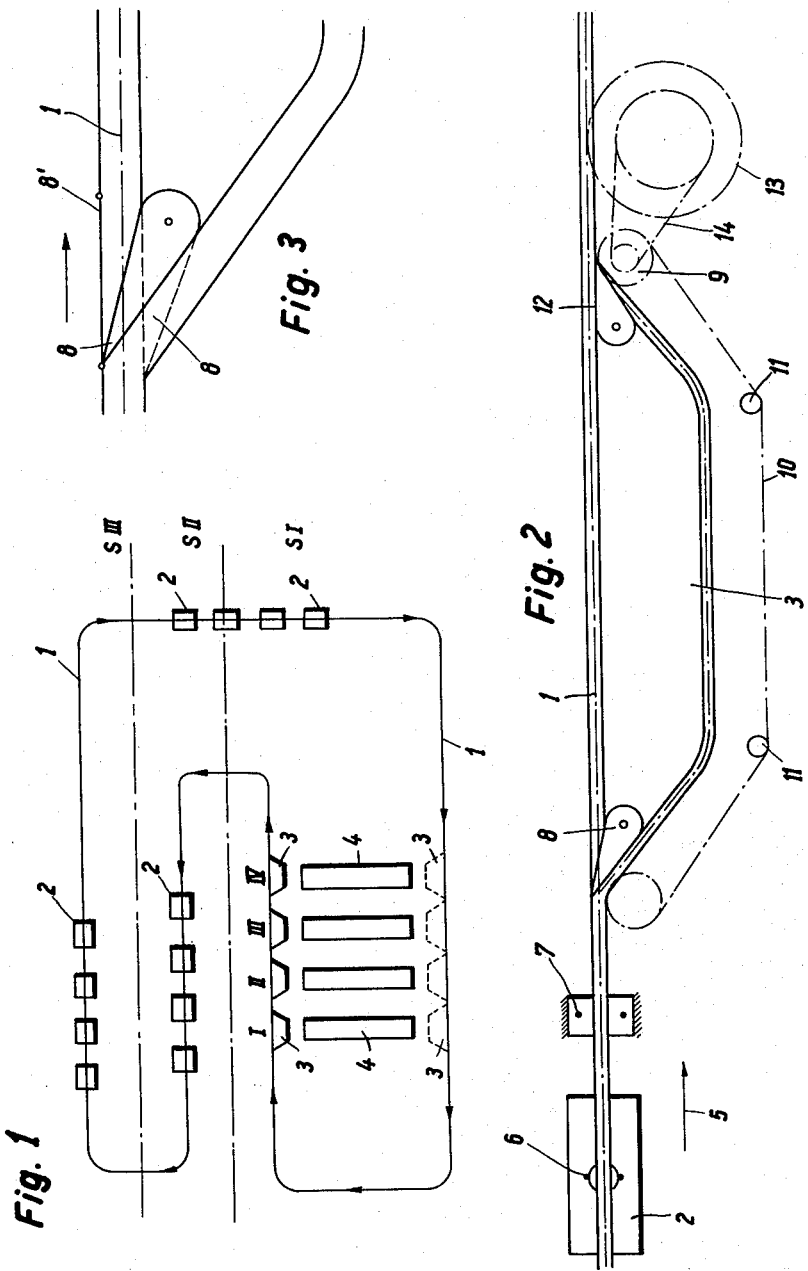
Inventor:
JON HARITON
By Toulmin & Toulmin
Attorneys March 23, 1965    J. HARITON    3,174,438
CONVEYER SYSTEM
Filed Feb. 12, 1962    6 Sheets-Sheet 2

Inventor:
JON HARITON
By Toulmin & Toulmin
Attorneys

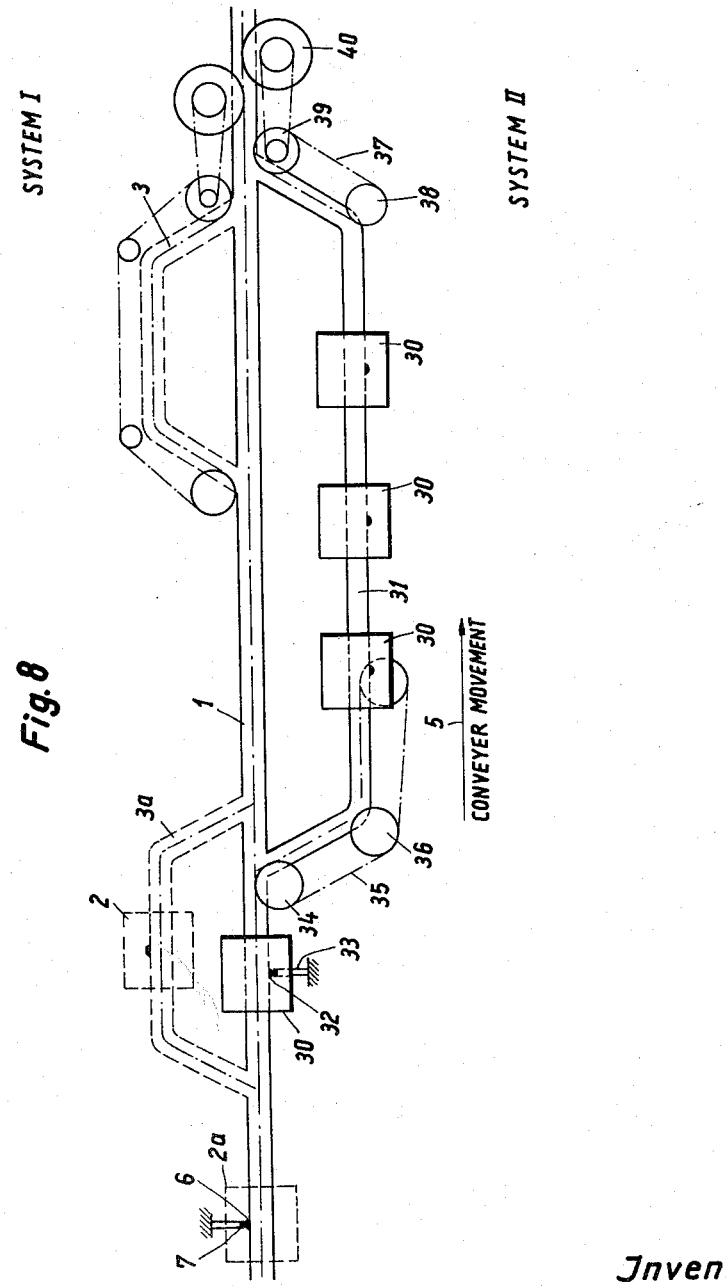

March 23, 1965  J. HARITON  3,174,438
CONVEYER SYSTEM
Filed Feb. 12, 1962  6 Sheets-Sheet 5

Inventor:
JON HARITON
By Toulmin & Toulmin
Attorneys

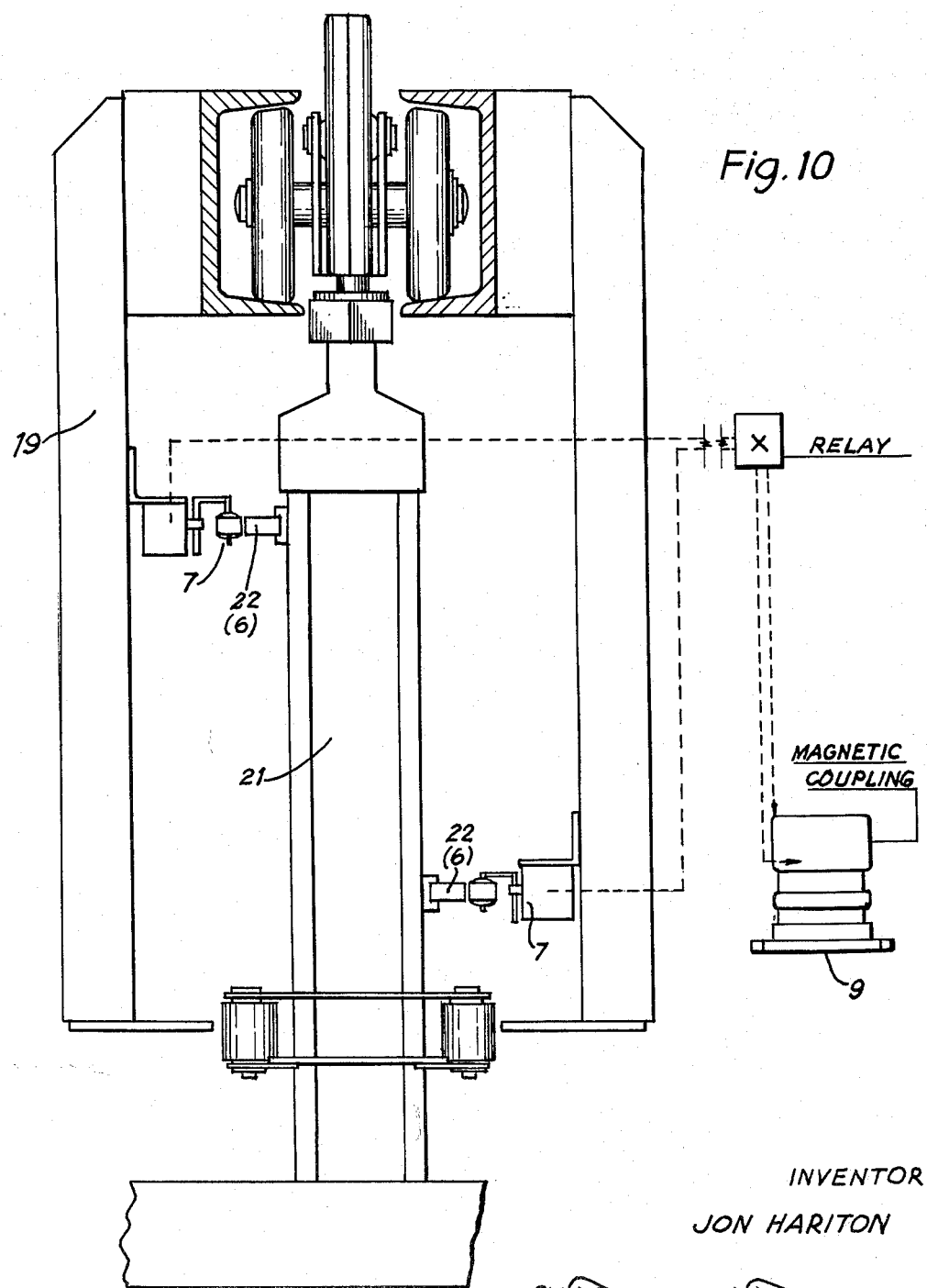

United States Patent Office 3,174,438
Patented Mar. 23, 1965

3,174,438
CONVEYOR SYSTEM
Jon Hariton, Frankfurt am Main, Germany, assignor to Neckermann Versand Kommanditgesellschaft, Frankfurt am Main, Germany
Filed Feb. 12, 1962, Ser. No. 172,480
Claims priority, application Germany, Feb. 18, 1961, N 19,622; June 3, 1961, N 20,134
18 Claims. (Cl. 104—88)

The present invention relates to a conveyor system for the transportation of various materials, more particularly, to a conveyer system wherein one or more separate carrier systems can be operated independently of each other with one of the carrier systems providing for the automatic transfer of predetermined ones of its carrier units to predetermined work stations.

The use of conveyer systems for transporting various articles and materials between a plurality of work stations is conventional. One particular application is to collect a plurality of different articles which are assembled at different places onto a main conveyer for transportation to a loading or packing area. In such a system a suitable carrier unit such as a container is transferred to a work station and remains there for a period of time is order that the articles at that particular station may be placed in the container. The duration of the stay of the container at a work station is usually a function of the speed of movement of the main conveyer.

Accordingly, suitable structure is provided to transfer various carrier units to predetermined work stations where they remain for a period of time sufficient for the loading of articles thereon. After the expiration of this time period, the containers are then returned to the main conveyer for transfer to another work station. This operation proceeds until the containers have contacted each of the work stations and the cycle is completed.

Not only can articles be placed in the containers while the containers are at the work stations, but the articles which already have been loaded on the containers can be checked for accuracy at certain work stations which function as checking points.

Such conveyer systems have become increasingly complicated and cumbersome, particularly when a large number of work stations is involved. Operating problems arise in making the most efficient use of such a conveyor system when it is desired that certain carrier units be transferred to certain work stations in a desired sequence.

It is therefore the principal object of the present invention to provide a novel and improved conveyer system for the transfer of predetermined carrier units to predetermined work stations.

It is a further object of the present invention to provide a conveyer system wherein a plurality of carrier systems can be independently operated.

It is another object of the present invention to provide a simplified conveyer system for the sequential switching of carrier units onto predetermined work stations where the carrier units remain for a duration of time dependent upon the speed of movement of the main conveyer.

The present invention essentially comprises a continuous or endless main conveyer which continuously moves carrier or transportation units which are either suspended from the conveyer or attached thereto. Work stations are provided into which the carrier units can be transferred and stationarily positioned therein for a predetermined period of time. The carrier units are assembled in a plurality of carrier systems wherein the number of carrier units in each system corresponds to the number of work stations. Control means are provided on the carrier units which automatically transfer each carrier unit into its previously determined work area.

The sequence of carrier units in the various carrier systems is the same and each carrier unit corresponds to a previously designated work station. The sequence of the carrier units in a system in the direction of movement of the main conveyer is the reverse of the sequence of work stations with respect to the same direction.

Each work station is so coordinated to the main conveyer that, when a carrier unit is transferred to a work station, a carrier unit which is already in that work station is simultaneously returned therefrom to the main conveyer.

The duration of time of the stay of a carrier unit in a work station is preferably the same for all of the work stations. However, this duration can be varied such as by varying the speed of movement of the main conveyer or by modifying the number of carrier units per system.

Several carrier systems may make up a single conveyer system.

The total length of the conveyer system is preferably an integral multiple of the length of one carrier system. The distance between the several carrier systems is greater than that between the carrier units of a single carrier system.

The present invention also provides for the simultaneous, but independent operation of a plurality of carrier systems wherein the units of one carrier system can be positioned between the units of another carrier system on the main conveyer. In such a modification, one carrier system is operated automatically wherein predetermined carrier units are transferred to predetermined work stations. The carrier units of the additional carrier systems are selectively transferred by an operator into desired work stations. Each carrier system is provided with its own group of work stations.

In the additional carrier systems, carrier units are transferred into work stations until no more carrier units can be accommodated therein. An automatic control thus provides that no further carrier units be transferred to this work station. A carrier unit can be returned from this work station to the main conveyer by suitable controls. It is preferable that the speed at which the carrier units are returned from a work station to the main conveyer is equal to the speed of the main conveyer. Thus, the work stations are provided with conveyer belts which are drivingly connected to the main conveyer.

The duration of the stay of the carrier units of the additional carrier systems can be selected as desired, since the work stations are provided with a capacity for a large number of carrier units.

Further objects and advantages of this invention will be apparent upon reference to the accompanying description when taken in conjunction with the following drawings, wherein FIGURE 1 is a schematic view of the main conveyer having a plurality of carrier systems thereon with a number of work stations;

FIGURE 2 is a top plan view, showing schematically one work station and a carrier unit on the main conveyer;

FIGURE 3 is a top plan view of an entrance switch for a work station;

FIGURE 8 is a top plan view of a modification of the conveyer system showing two work stations for one carrier system and one work station for another carrier system.

FIGURE 10 is a view similar to FIGURE 9 showing a modification thereof with the addition of a relay and magnetic coupling.

Figure 4:
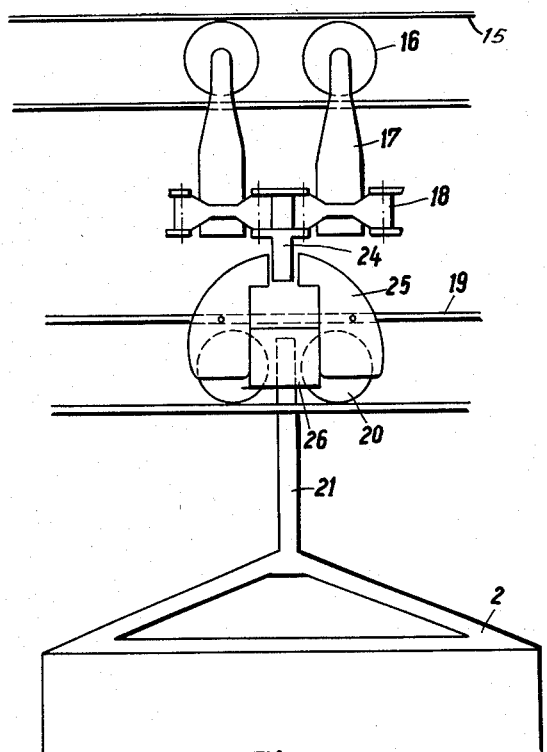
FIGURE 4 is a side elevational view, showing the structure for suspending a carrier unit from a conveyer.

Returning now to the drawings wherein like reference symbols indicate the same parts throughout the various views, the conveyer system shown in FIGURE 1 is arranged throughout three floors of a building indicated S I, S II and S III. In order to clarify this drawing, the floors are shown in side-by-side relationship.

The conveyer system comprises an endless conveyer chain 1 which is provided with carrier units 2. The main conveyer may consist of any conventional endless conveyer and may comprise a chain conveyer, a rope, rail or belt conveyer.

The carrier units may comprise any type of a container, bin, bucket or basket or even conventional hooks or attachments on a conveyer to which conventional carriers such as wheeled carts may be attached.

The floor S I is provided with a plurality of work stations 3 which are designated I through IV. The work stations 3 are positioned at the ends of tables 4 upon which are piled the articles or commodities which are to be loaded into the carrier units when the units are stopped at a work station. While the drawing shows the work stations as being located on only one floor, it is to be understood that the work stations can be provided on a plurality of floors.

Proceeding next to FIGURE 2, there is illustrated one of the work stations 3 towards which a carrier 2 is moving in a direction indicated by the arrow 5. The carrier unit 2 is provided with contacts 6 which are positioned to engage stationary contacts 7. The closing of these contacts completes the circuit which opens the switch 8, whereby the carrier unit 2 is transferred onto the work station 3.

The contacts 7 are so positioned, so as to be actuated by the contacts 6 only if the carrier unit 2 has been previously designated as to be transferred to this particular work station.

Simultaneously with the opening of the switch 8 the magnetic coupling 9 of the secondary conveyor chain 10 is drivingly connected to the main conveyor by means of a gear 13 so that when the carrier unit 2 enters work station 3, it will be transported by the movement of the conveyor chain 10 approximately to the center thereof when the movement of the chain is stopped. The shaft of the carrier unit contains one or more contacts 22 designated in FIGURE 2 by 6. The rail 19, FIGURE 10, carries cooperating contacts 7. When contacts 22 and 7 come into engagement a locking relay will be energized which will give an impulse to the magnetic coupling 9, FIGS. 2 and 10, and thereby establish a power connection between the gear 13 which is continually in mesh with the main conveyor chain 1 and the secondary conveyor chain 10 so as to actuate the latter.

An exit or outlet switch 12 is provided at the upper end of the work station 3 and is spring-biased into the closed position as illustrated in FIGURE 2. The switch 12 is opened by the movement of the carrier unit 2.

The secondary conveyor 10 is drivingly connected to the main conveyor 1 through clutch means located in the driving gear 9 so as to be drivingly connected with a gear 13 through a belt 14. The gear 13 is permanently connected to the main conveyor chain 1.

FIGURE 3 shows the entrance switch 8 in the opened position. Both the entrance and exit switches can be so constructed that a section of the bearing rail of the main conveyer, indicated at 8', moves with the switch.

Figure 5:
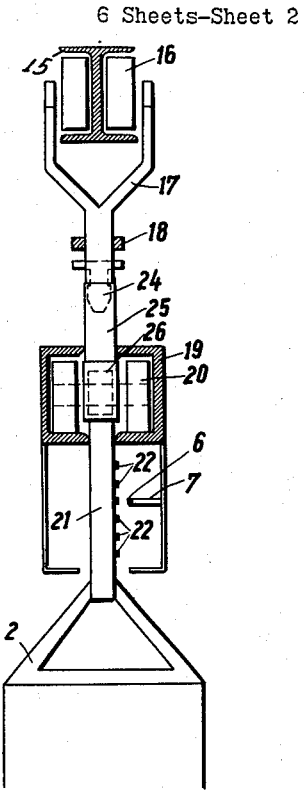
FIGURE 5 is a front elevational view of the structure shown in FIGURE 4 with the rails being shown in section.

Proceeding next to FIGURES 4 and 5 the structural details of the conveyer and the manner in which the carrier units are suspended therefrom, are shown in detail. The main conveyer comprises an I-shaped supporting rail 15 with rolls or wheels 16 of the carrier unit rolling along the flanges thereof, as shown in FIGURE 5. Supporting members 17 are attached to the wheels 16 and guide the main conveyer chain 18.

A pair of channel-shaped members 19 are provided to receive rollers 20 along the inner flanges thereof. The carrier unit 2 is suspended from the rollers 20 by a frame member 21.

There is a plurality of electrical contacts 22 mounted on the supporting frame 21. One of the contacts is designated as 6 and is positioned to engage the stationary contact 7 supported from track member 19. The contacts 22 comprise the controlling system for the carrier units and at least one contact of the contacts 22 is positioned to engage a particular stationary contact 7 in order to open a switch of predesignated work station 3. The control circuitry by which the switch 8 and the secondary conveyor 10 are controlled is conventional and need not be further described in detail.

As an alternative, each of the carrier units may be provided with only a single contact with that contact being engageable with a particular stationary contact of a predetermined work station. However, as shown in FIGURE 5, each carrier unit is equipped with the same number of contacts, but only one of these contacts engages a stationary contact 7 to direct the carrier unit into a particular work station.

Coupling members or attachments 24 are spaced along the conveyer chain 18 and are engaged by latches 25 of a carrier unit 2. This structure provides a direct connection between the carrier unit 2 and the main conveyer chain 18.

The latch 25 is so constructed so as to connect the carrier unit to the chain 18 by a suitable stop member 26 which limits rotation of latch 25 in one direction. The latch 25, however, permits the carrier unit to be detached from the attachment 24 merely by moving the carrier unit transversely of the main conveyer chain 18. Thus, when a carrier unit is switched onto a work station by a switch 8, the carrier unit is moved transversely of the main conveyer chain 18 and detached therefrom. The subsequent movement of the carrier unit is then accomplished by the secondary conveyer chain 10 of the work station. This conveyer chain moves the carrier unit 2 into the center of the work station while, at the same time, a carrier unit, which has been previously positioned in the work station, is returned therefrom onto the main conveyer chain 18. After the new carrier unit is positioned in the center of the work station, the drive for the secondary conveyer chain 10 is stopped by disconnecting the drive gear 9 and the carrier unit is stationarily positioned at the work station.

Figure 6:
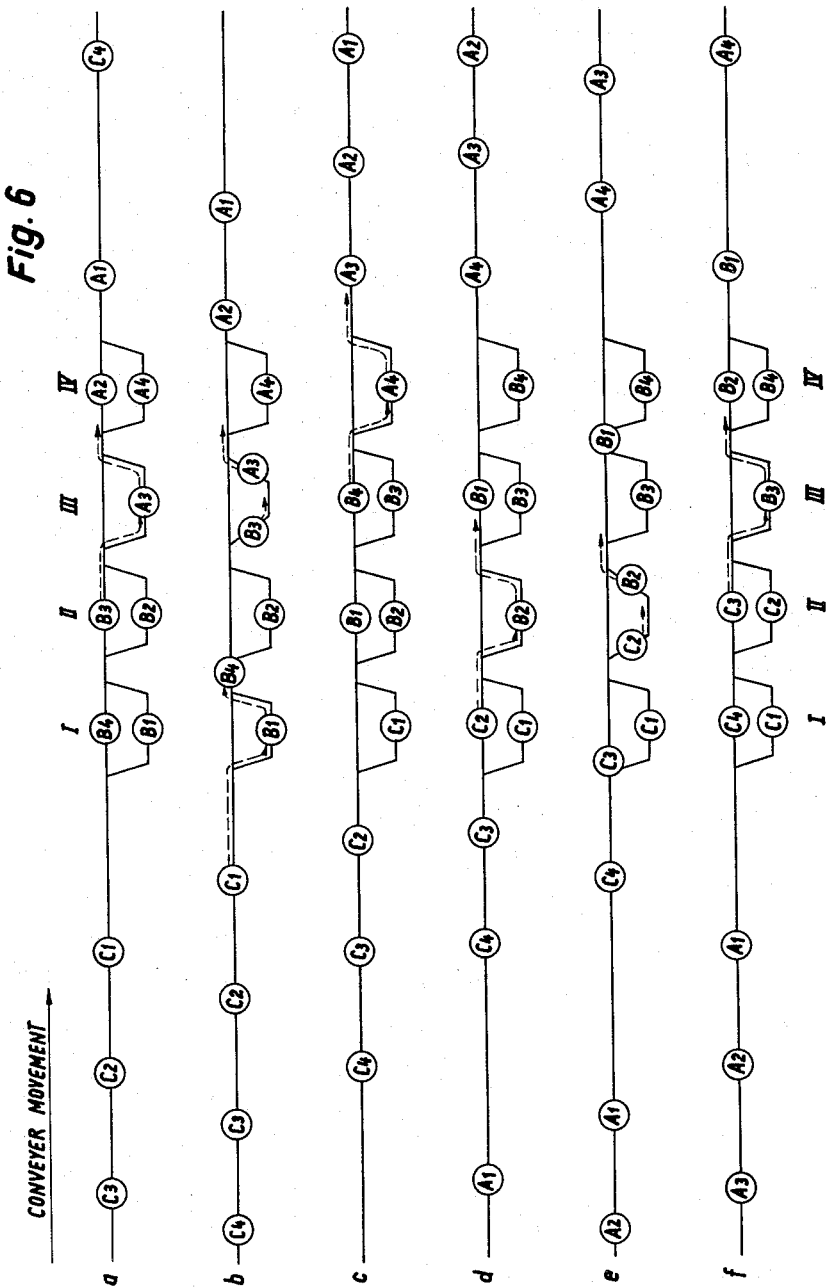
FIGURE 6 is a schematic view showing the sequence in which the carrier units are switched into and out of the work stations.

Proceeding next to FIGURE 6, there is shown schematically the sequence in which the various carrier units of a plurality of carrier systems are transferred to work stations and returned therefrom. For purposes of clarity in the explanation of the operation of this invention, the conveyer system comprises three carrier systems designated A, B and C with the carrier units of the systems being designated as C1, C2, C3 and C4. The space between the last carrier unit of one system and the first carrier unit of the subsequent system is greater than the spaces between the individual carrier units of the same system. This space is so chosen that a single carrier unit can be positioned between the two carrier systems.

The several work stations are designated I, II, III and IV, each of which is provided with an entrance and exit rail upon which the carrier units can be switched into and out of the work stations. The positioning of the carrier units during various stages of operation are described in six phases designated a through f.

In phase a (reading from left to right) the carrier units C3, C2, C1, B4, B3, A2, A1 and C4 are positioned on the main conveyer with one carrier unit being omitted between C1 and B4, B3 and A2, and between A1 and C4. The following carrier units are positioned in the work areas: B1 in area I, B2 in area II, A3 in area III, and A4 in area IV.

Phase b shows the individual carrier units on the main conveyer, B4 moved further to the right as shown in FIGURE 6 in the direction of movement of the main conveyer. The unit B1 remains in work station I, B2 remains in station II. Carrier unit B3, however, has actuated the switching and driving mechanism for work station III, so that unit B3 is shown entering work station III and A3 is shown leaving station III. Carrier unit C1 has just entered the control area for work station I.

In phase c unit C1 has already entered work station I and unit B1 has already left the same work station.

In phase d the status of the carrier units in work stations I, II and III is the same as in phase c, but unit B4 has moved into work station IV. On the main conveyer the carrier units have been moved one space further to the right so that carrier unit C2 has entered the control area of work station II.

In phase e the carrier unit C2 is entering work station II and the unit B2 is leaving work station II and follows carrier unit B1.

Phase f shows the completion of the movement illustrated in phase e and corresponds cyclically to phase a. The entire process is again repeated in the manner as described above.

It is pointed out that in the present invention the carrier units 1 of each carrier system always enter work station I, the carrier units C2 of each carrier system enter work station II, and so on for carrier units C3 and C4.

Figure 7:
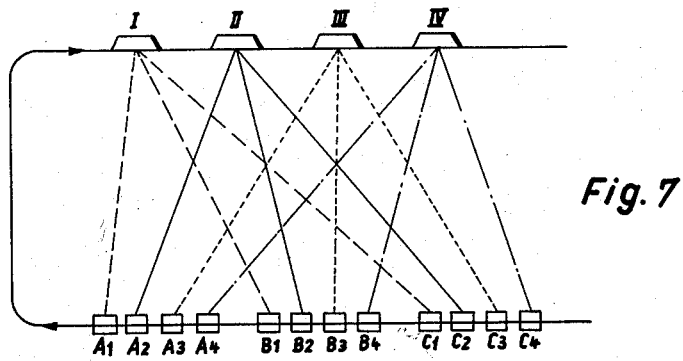
FIGURE 7 is a schematic view illustrating the correlation between the carrier units of the several systems and the work stations.

FIGURE 7 illustrates schematically the sequence in which the several carrier units of the carrier systems enter into their coordinated work stations.

Proceeding next to FIGURE 8, there is shown a modification of the present invention wherein two or more carrier systems can be simultaneously but independently operated on the main conveyer line. In FIGURE 8, carrier system I is drawn in dot-dash lines and positioned above the center line of the main conveyer 1. The components belonging to carrier system II are illustrated in solid lines and positioned below the center line of the main carrier 1. Carrier system I corresponds to a carrier system described with respect to FIGURES 1 through 7 and carrier system II refers to an additional system operated between the carrier units of system I.

System I has a plurality of work stations of which only two are illustrated and these are indicated at 3 and 3a. Carrier units 2 are similarly moved on the main conveyer 1. Carrier unit 2a is shown with its contact 6 engaging the stationary contact 7 so as to actuate the switching and driving means of work station 3a.

On the same main conveyer 1, carrier units 30 of system II are directed towards the work station 31. The carrier units 30 are similar to the carrier units 2 and are provided with a contact 32 which engages a stationary contact 33 to actuate a suitable control system for opening the switch leading into work station 31 and for energizing the secondary conveyer belt of work station 31.

As a carrier unit 30 enters the control area of work station 31, the engagement of contacts 32 and 33 also energizes drive 34 for a secondary conveyer 35 which is positioned over rollers or idlers 36. The movement of the secondary conveyer 34 directs the carrier units 30 into the work station 31.

Contrary to the arrangement in system I, the carrier units of system II are not pulled into the center of the work station but only a sufficient distance to clear the entrance switch. The forward movement of the carrier units within a work station 31 occurs each time a new carrier unit enters the work station. The new carrier units will push the previously switched carrier units further along the work station track 31. Thus, each time a new carrier unit enters work station 31, all of the carrier units therein are moved forward by the distance of one unit.

Under certain circumstances it may be desirable to move the carrier units after their entrance into the work station 31 manually or by another secondary conveyer. As shown in FIGURE 8, a further secondary conveyer 37 is provided at the exit of work station 31 and is supported upon an idler 38 and a driving unit 39 which is drivingly connected to a gear 40 permanently connected to the main conveyer belt 1. The secondary conveyer 37 returns the carrier units to the main conveyer 1. Since the secondary conveyer is powered from the main conveyer, the speed at which the carrier units leave the work stations and enter the main carrier unit is equal to the speed of movement of the main carrier.

Figure 9:
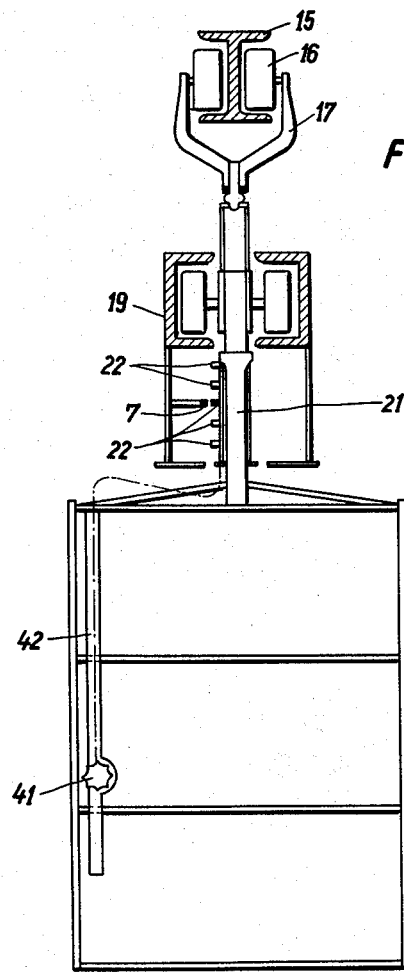
FIGURE 9 is a view similar to that of FIGURE 5 and showing a modification thereof.

The manner in which the carrier units of system II are driven by the main conveyer is illustrated in FIGURE 9 and is substantially similar to the structure shown in FIGURE 5. While only a few contacts 22 are illustrated, it is to be understood that a greater number of contacts may be employed with some of these contacts being positioned on the other side of the supporting frame 21. In order to ensure a separation of the contact arrangement of system II and that of system I, the contacts of the two systems are positioned at different levels or staggeredly arranged on the supporting shaft 21. The contacts 22 may be adjusted with respect to the stationary contact 7 by means of a manually operable adjusting wheel 41 which actuates a flexible connection 42 such as a cable or the like.

It is pointed out that, basically, the two carrier systems I and II of FIGURE 8 are different. System I operates on a predetermined basis with the coordination between the contacts 22 on the carrier units and the stationary contact 7 being predetermined and changed only when the entire system is changed. In system II, however, the contacts are adjustable and accordingly the several carrier units can be selectively directed to various work stations by an operator who manipulates the adjusting hand wheel 41 upon the carrier units. Thus, when an operator perceives that a particular work station 30 is fully occupied, he actuates the relationship of the contacts so that a particular carrier unit will go past this work station and travel around the main conveyer. By the time this carrier unit returns again to this work station, space may be available in the work station and the unit may be directed thereto.

Carrier units may be returned from a work station to the main conveyer by manually transporting the carrier unit to a transmitter which discharges electric pulses which actuate the secondary conveyer to return the carrier unit to the main conveyer.

Thus, the present invention provides a carrier system which is operable by conventional electrical control circuits but wherein a simplified relationship between the carrier units of a plurality of carrier systems and the work stations is provided. In order to correlate the modification of FIGURE 8 with the embodiment as described in FIGURES 1 through 7, it is pointed out that the carrier systems a, b, c of FIGURE 6 would correspond to carrier system I of FIGURE 8. Carrier system II of FIGURE 8 represents an additional carrier system whose carrier units would be interspersed between the carrier units of the carrier systems a, b, c. Thus, the carrier systems a, b and c would be operated on a predetermined basis wherein each of the carrier units is directed to a predetermined work station, whereas the additional carrier system, whose units are interspersed between the carrier units of systems a, b, and c, will be operated on a selective basis with the carrier units thereof being directed to various work stations as circumstances require.

It will be understood that this invention is susceptible to modification in order to adapt it to different usages and conditions and, accordingly, it is desired to comprehend such modifications within this invention as may fall within the scope of the appended claims.

What is claimed as this invention is:

1. A conveyer system comprising an endless main conveyer, a plurality of carrier units on said main conveyer defining a carrier system, a corresponding plurality of work stations to receive said carrier units for stationary positioning therein, each of said work stations being coordinated to a predetermined one of said carrier units of a carrier system, means operatively connecting said work stations with said main conveyor for transferring a predetermined carrier unit from said main conveyer to its coordinated work station while returning a carrier unit from said work station to the main conveyer, and control means on said carrier units for actuating said transfer means to direct said carrier units to the predetermined ones of said work stations.

2. A conveyer system comprising an endless main conveyer, a plurality of carrier units on said main conveyer defining a carrier system, a corresponding plurality of work stations to receive said carrier units for stationary positioning therein, each of said work stations being coordinated to a predetermined one of said carrier units of a carrier system, automatically operated switch means cooperating with a secondary conveyer operatively connecting said work stations with said main conveyor for transferring a predetermined carrier unit from said main conveyer to its coordinated work station while returning a carrier unit from said work station to the main conveyer, and control means on said carrier units for actuating said transfer means to direct said carrier units to the predetermined ones of said work stations, said carrier unit remaining stationary at said work station until said transfer means is again actuated by the control means on another carrier unit.

3. A conveyer system comprising an endless main conveyer, a plurality of carrier units on said main conveyer defining a carrier system, a corresponding plurality of work stations to receive said carrier units for stationary positioning therein, each of said work stations being coordinated to a predetermined one of said carrier units of a carrier system, the carrier units of a carrier system being in a predetermined sequence which sequence in the direction of movement of the main conveyer is inverse to the sequence of the respective coordinated work stations in the same direction, automatically operated switch means cooperating with a secondary conveyer operatively connecting said work stations with said main conveyer for transferring a predetermined carrier unit from said main conveyer to its coordinated work station while returning a carrier unit from said work station to the main conveyer, and control means on said carrier units for actuating said transfer means to direct said carrier units to the predetermined ones of said work stations, said carrier unit remaining stationary at said work station until said transfer means is again actuated by the control means on another carrier unit.

4. A conveyer system as claimed in claim 2, wherein said control means comprises electrical pulse transmitting apparatus with said transmitted pulses being received by said transfer means to actuate the same.

5. A conveyer system comprising an endless main conveyer, a plurality of carrier units on said main conveyer defining a carrier system, a corresponding plurality of secondary endless conveyers to receive said carrier units transferred from said main conveyer for stationary positioning thereon and defining work stations, means for actuating said secondary conveyers so that a carrier unit is returned to the main conveyer concurrently with the transfer of a carrier unit from said main conveyer to said secondary conveyer, each of said work stations being coordinated to a predetermined one of said carrier units of a carrier system, automatically operated switch means cooperating with a secondary conveyer operatively connecting said work stations with said main conveyor for transferring a predetermined carrier unit from said main conveyer to its coordinated work station while returning a carrier unit from said work station to the main conveyer, and control means on said carrier units for actuating said transfer means to direct said carrier units to the predetermined ones of said work stations, said carrier unit remaining stationary at said work station until said transfer means is again actuated by the control means on another carrier unit.

6. A conveyer system comprising an endless main conveyer, a plurality of carrier units on said main conveyer defining a carrier system, a corresponding plurality of secondary endless conveyers to receive said carrier units transferred from said main conveyer for stationary positioning thereon and defining work stations, means for actuating said secondary conveyers so that a carrier unit is returned to the main conveyer concurrently with the transfer of a carrier unit from said main conveyer to said secondary conveyer, means for drivingly connecting said secondary conveyers to said main conveyer, each of said work stations being coordinated to a predetermined one of said carrier units of a carrier system, automatically operated switch means cooperating with a secondary conveyer operatively connecting said work stations with said main conveyor for transferring a predetermined carrier unit from said main conveyer to its coordinated work station while returning a carrier unit from said work station to the main conveyer, and control means on said carrier units for actuating said transfer means to direct said carrier units to the predetermined ones of said work stations, said carrier unit remaining stationary at said work station until said transfer means is again actuated by the control means on another carrier unit.

7. A conveyer system comprising an endless main conveyer, a plurality of carrier units on said main conveyer defining a carrier system, a corresponding plurality of secondary endless conveyers to receive said carrier units transferred from said main conveyer for stationary positioning thereon and defining work stations, means for actuating said secondary conveyers so that a carrier unit is returned to the main conveyer concurrently with the transfer of a carrier unit from said main conveyer to said secondary conveyer, means for drivingly connecting said secondary conveyers to said main conveyer, each of said work stations being coordinated to a predetermined one of said carrier units of a carrier system, automatically operated switch means cooperating with a secondary conveyer operatively connecting said work stations with said main conveyor for transferring a predetermined carrier unit from said main conveyer to its coordinated work station while returning a carrier unit from said work station to the main conveyer, and control means on said carrier units for actuating said transfer means to direct said carrier units to the predetermined ones of said work stations, said connecting means being actuated simultaneously with the actuation of said transfer means by said carrier unit control means, said carrier unit remaining stationary at said work station until said transfer means is again actuated by the control means on another carrier unit.

8. A conveyer system comprising an endless main conveyer, a plurality of series of carrier units on said main conveyer with each series consisting of the same number of carrier units, the spacing on the main conveyer being greater between said series than between the carrier units of a single series, a plurality of work stations corresponding to the plurality of carrier units in a carrier system to receive said carrier units for stationary positioning therein, each of said work stations being coordinated to a predetermined one of said carrier units of a carrier system, automatically operated switch means cooperating with a secondary conveyer operatively connecting said work stations with said main conveyor for transferring a predetermined carrier unit from said main conveyer to its coordinated work station while returning a carrier unit from said work station to the main conveyer, and control means on said carrier units for actuating said transfer means to direct said carrier units to the predetermined ones of said work stations, said carrier units remaining stationary at said work station until said transfer means is again actuated by the control means on another carrier unit.

9. A conveyer system comprising an endless main conveyer, a plurality of attachments on said main conveyer for connection to material handling units to transport said units, a corresponding plurality of work stations to receive the material handling units attached to said main conveyer for stationary positioning therein, each of said work stations being coordinated to a predetermined one of said attachments, automatically operated switch means cooperating with a secondary conveyer operatively connecting said work stations with said main conveyer for transferring a predetermined attachment from said main conveyer to its coordinated work station while returning an attachment from said work station to the main conveyer, and control means on said attachments for actuating said transfer means to direct said attachments to the predetermined ones of said work stations, said attachment remaining stationary at said work station until said transfer means is again actuated by the control means on another attachment.

10. A conveyer system comprising an endless main conveyer, first and second pluralities of carrier units on said main conveyer defining first and second carrier systems, the units of said second carrier system being interspersed on said main conveyer between the units of said first carrier system, a first plurality of work stations corresponding to the plurality of units of said first carrier system and a second plurality of work stations for said second carrier system to receive said respective carrier units for stationary positioning thereon, each of said first plurality of work stations being coordinated to a predetermined one of said carrier units of said first carrier system, automatically operated switch means cooperating with a secondary conveyer operatively connecting said first plurality of work stations with said main conveyer for transferring a predetermined carrier unit of said first carrier system from said main conveyer to its coordinated work station while retaining a first system carrier unit from said work station to the main conveyer, control means on said first system carrier units for actuating said transfer means to direct said carrier units to the predetermined one of said first plurality of work stations, and means for selectively transferring the second carrier system units to preselected ones of said second plurality of work stations.

11. A conveyer system comprising an endless main conveyer, first and second pluralities of carrier units on said main conveyer defining first and second carrier systems, the units of said second carrier system being interspersed on said main conveyer between the units of said first carrier system, a first plurality of work stations corresponding to the plurality of units of said first carrier system and a second plurality of work stations for said second carrier system to receive said respective carrier units for stationary positioning thereon, each of said first plurality of work stations being coordinated to a predetermined one of said carrier units of said first carrier system, automatically operated switch means cooperating with a secondary conveyer operatively connecting said first plurality of work stations with said main conveyer for transferring a predetermined carrier unit of said first carrier system from said main conveyer to its coordinated work station while returning a first system carrier unit from said work station to the main conveyer, control means on said first system carrier units for actuating said transfer means to direct said carrier units to the predetermined one of said first plurality of work stations, means operatively connecting said second plurality of work stations with said main conveyer for transferring carrier units of said second carrier system from said main conveyer to a work station and returning a second system carrier unit from said work station to the main conveyer, and control means on said second system carrier units for selectively actuating said second carrier system transfer means to direct corresponding carrier units to the second plurality of work stations.

12. A conveyer system comprising an endless main conveyer, first and second pluralities of carrier units on said main conveyer defining first and second carrier systems, the units of said second carrier system being interspersed on said main conveyer between the units of said first carrier system, a first plurality of work stations corresponding to the plurality of units of said first carrier system and a second plurality of work stations for said second carrier system to receive said respective carrier units for stationary positioning thereon, each of said first plurality of work stations being coordinated to a predetermined one of said carrier units of said first carrier system, automatically operated switch means cooperating with a secondary conveyer operatively connecting said first plurality of work stations with said main conveyer for transferring a predetermined carrier unit of said first carrier system fom said main conveyer to its coordinated work station while returning a first system carrier unit from said work station to the main conveyer, control means on said first system carrier units for actuating said transfer means to direct said carrier units to the predetermined one of said first plurality of work stations, means operatively connecting said second plurality of work stations with said main conveyer for transferring a predetermined carrier unit of said second carrier system from said main conveyer to a predetermined work station, and control means on said second system carrier units for actuating said transfer means to direct said carrier units to the predetermined one of said second plurality of work stations.

13. A conveyer system comprising an endless main conveyer, first and second pluralities of carrier units on said main conveyer defining first and second carrier systems, the units of said second carrier system being interspersed on said main conveyer between the units of said first carrier system, a first plurality of work stations corresponding to the plurality of units of said first carrier system and a second plurality of work stations for said second carrier system to receive said respective carrier units for stationary positioning thereon, each of said first plurality of work stations being coordinated to a predetermined one of said carrier units of said first carrier system, automatically operated switch means cooperating with a secondary conveyer operatively connecting said first plurality of work stations with said main conveyer for transferring a predetermined carrier unit of said first carrier system fom said main conveyer to its coordinated work station while returning a first system carrier unit from said work station to the main conveyer, control means on said first system carrier units for actuating said transfer means to direct said carrier units to the predetermined one of said first plurality of work stations, and means for selectively transferring the second carrier system units to preselected ones of said second plurality of work stations.

14. A conveyer system comprising an endless main conveyer, first and second pluralities of carrier units on said main conveyer defining first and second carrier systems, the units of said second carrier system being interspersed on said main conveyer between the units of said first carrier system, a first plurality of work stations corresponding to the plurality of units of said first carrier system and a second plurality of work stations for said second carrier system to receive said respective carrier units for stationary positioning thereon, each of said first plurality of work stations being coordinated to a predetermined one of said carrier units of said first carrier system, automatically operated switch means cooperating with a secondary conveyer operatively connecting said first plurality of work stations with said main conveyer for transferring a predetermined carrier unit of said first carrier system from said main conveyer to its coordinated work station while returning a first system carrier unit from said work station to the main conveyer, control means on said first system carrier units for actuating said transfer means to direct said carrier units to the predetermined one of said first plurality of work stations, and means for selectively transferring the second carrier system units to preselected ones of said second plurality of work stations.

15. A conveyer system comprising an endless main conveyer, first and second pluralities of carrier units on said main conveyer defining first and second carrier systems, the units of said second carrier system being interspersed on said main conveyer between the units of said first carrier system, a first plurality of work stations corresponding to the plurality of units of said first carrier system and a second plurality of work stations for said second carrier system to receive said respective carrier units for stationary positioning thereon, each of said first plurality of work stations being coordinated to a predetermined one of said carrier units of said first carrier system, automatically operated switch means cooperating with a secondary conveyer operatively connecting said first plurality of work stations with said main conveyer for transferring a predetermined carrier unit of said first carrier system from said main conveyer to its coordinated work station while returning a first system carrier unit from said work station to the main conveyer, control means on said first system carrier units for actuating said transfer means to direct said carrier units to the predetermined one of said first plurality of work stations, and means for selectively transferring the second carrier system units to preselected ones of said second plurality of work stations, said first and second carrier systems being simultaneously operable on said main conveyer.

16. A conveyer system comprising an endless main conveyer, a plurality of systems of carrier units on said main conveyer, a plurality of work stations corresponding in number to the number of carrier units in each system to receive said carrier units for stationary positioning therein, each of said work stations being coordinated to a predetermined one of said carrier units of each carrier system, automatically operated switch means cooperating with a secondary conveyer operatively connecting said work stations with said main conveyer for transferring a predetermined carrier unit of one carrier system from said main conveyer to its coordinated work station while returning a carrier unit of another carrier system from its work station to the main conveyer, and control means on said carrier units for actuating said transfer means to direct said carrier units to the predetermined ones of said work stations.

17. A conveyer system comprising an endless main conveyer, a plurality of systems of carrier units on said main conveyer, a plurality of work stations corresponding in number to the number of carrier units in each system to receive said carrier units for stationary positioning therein, each of said work stations being coordinated to a predetermined one of said carrier units of each carrier system, automatically operated switch means cooperating with a secondary conveyer operatively connecting said work stations with said main conveyer for transferring a predetermined carrier unit of one carrier system from said main conveyer to its coordinated work station while returning a carrier unit of another carrier system from said work station to the main conveyer, said last named means comprising a secondary conveyer drivingly connected to the main conveyer, and control means on said carrier units for actuating said transfer means to direct said carrier units to the predetermined ones of said work stations.

18. A conveyor system comprising an endless main conveyor, a plurality of carrier units on said main conveyor defining a carrier system, a corresponding plurality of work stations to receive said carrier units for stationary positioning therein, each of said work stations being coordinated to a predetermined one of said carrier units of a carrier system, automatically operated switch means cooperating with a secondary conveyor operatively connecting said work stations with said main conveyor for transferring a predetermined carrier unit from said main conveyor to its coordinated work station while returning a carrier unit from said work station to the main conveyor, and control means on said carrier units for actuating said transfer means to direct said carrier units to the predetermined ones of said work stations, said carrier unit remaining stationary at said work station until said transfer means is again actuated by the control means on another carrier unit.

References Cited by the Examiner
UNITED STATES PATENTS

| | | | |
|---|---|---|---|
| 1,294,813 | 2/19 | Lammert et al. | 104—173 |
| 2,868,138 | 1/59 | Bishop et al. | 104—88 |
| 2,868,139 | 1/59 | Klamp | 104—88 |
| 2,875,704 | 3/59 | Yates | 104—96 |
| 3,045,610 | 7/62 | Klamp | 104—88 |
| 3,048,123 | 8/62 | Burmeister et al. | 104—88 |

EUGENE G. BOTZ, *Primary Examiner.*

LEO QUACKENBUSH, *Examiner.*